United States Patent
Yang

(10) Patent No.: US 10,614,320 B2
(45) Date of Patent: Apr. 7, 2020

(54) SYSTEM AND METHOD FOR ADVANCED HIGHWAY LANE DETECTION

(71) Applicant: Honda Motor Co., Ltd., Tokyo (JP)

(72) Inventor: Shuowei Yang, Troy, MI (US)

(73) Assignee: Honda Motor Co., Ltd., Tokyo (JP)

( * ) Notice: Subject to any disclaimer, the term of this patent is extended or adjusted under 35 U.S.C. 154(b) by 94 days.

(21) Appl. No.: 15/944,363

(22) Filed: Apr. 3, 2018

(65) Prior Publication Data
US 2019/0303688 A1  Oct. 3, 2019

(51) Int. Cl.
| | |
|---|---|
| *G06K 9/00* | (2006.01) |
| *G06T 7/536* | (2017.01) |
| *G06K 9/62* | (2006.01) |
| *G05D 1/02* | (2020.01) |
| *G08G 1/16* | (2006.01) |

(Continued)

(52) U.S. Cl.
CPC ......... *G06K 9/00798* (2013.01); *G06K 9/627* (2013.01); *G06T 7/11* (2017.01); *G06T 7/529* (2017.01); *G06T 7/536* (2017.01); *G05D 1/0246* (2013.01); *G05D 2201/0213* (2013.01); *G06T 2207/10028* (2013.01);

(Continued)

(58) Field of Classification Search
CPC ........... G06K 9/00798; G06K 9/00791; G06K 9/00805; G06K 9/00812; G06K 9/627; G06K 9/6271; G06K 9/6272; G06K 9/6273; G06K 9/6274; G06K 9/6275; G06K 9/6276; G06K 9/6269; G06T 7/536; G06T 7/529; G06T 7/521; G06T 7/50
USPC .................. 382/100, 103–104, 113, 106–107
See application file for complete search history.

(56) References Cited

U.S. PATENT DOCUMENTS

| | | |
|---|---|---|
| 6,813,370 B1 | 11/2004 | Arai |
| 7,583,816 B2 | 9/2009 | Kakinami et al. |

(Continued)

FOREIGN PATENT DOCUMENTS

| | | |
|---|---|---|
| CN | 103295420 | 9/2013 |
| JP | 3818641 B2 | 9/2006 |
| KR | 20180092765 A * | 8/2018 |

OTHER PUBLICATIONS

Hortovanyi, "Advanced Lane Detection", https://medium.com/@NickHortovanyi/advanced-lane-detection-8b98b79b9cac, printed on Apr. 3, 2018, 10 pages.

(Continued)

*Primary Examiner* — Dwayne D Bost
*Assistant Examiner* — Stephen M Brinich
(74) *Attorney, Agent, or Firm* — Rankin, Hill & Clark LLP

(57) ABSTRACT

A computer-implemented method for lane detection includes receiving a road image from an image capture device, detecting a first solid line marking and a second solid line marking outside of the first solid line marking in the binary road image. The first solid line marking and the second solid line marking are non-parallel lines. The method includes calculating a first distance between a first point of the first solid line marking and a first point of the second solid line marking. The first points being in a top portion of the binary road image. The method includes calculating a second distance between a second point of the first solid line marking and a second point of the second solid line marking. The second points being in a bottom portion of the binary road image. Further, the method includes determining a merging lane based the first distance and the second distance.

20 Claims, 10 Drawing Sheets

(51) Int. Cl.
 *G06T 7/11* (2017.01)
 *G06T 7/529* (2017.01)

(52) U.S. Cl.
 CPC .............. *G06T 2207/20048* (2013.01); *G06T 2207/30256* (2013.01); *G08G 1/167* (2013.01)

(56) References Cited

U.S. PATENT DOCUMENTS

| | | | |
|---|---|---|---|
| 8,639,433 B2* | 1/2014 | Meis | G06K 9/00798 |
| | | | 701/116 |
| 9,738,280 B2 | 8/2017 | Rayes | |
| 10,146,223 B1* | 12/2018 | Luders | G01S 17/936 |
| 2013/0169792 A1* | 7/2013 | Mathes | B62D 15/027 |
| | | | 348/119 |
| 2015/0278612 A1* | 10/2015 | Sakamoto | B62D 15/025 |
| | | | 701/41 |
| 2016/0140401 A1 | 5/2016 | Ishigami et al. | |
| 2016/0307050 A1 | 10/2016 | Das et al. | |
| 2016/0350603 A1 | 12/2016 | Suddamalla et al. | |
| 2017/0243491 A1* | 8/2017 | Fujii | G08G 1/167 |
| 2018/0067496 A1* | 3/2018 | Prasad | G01S 15/931 |
| 2018/0362084 A1* | 12/2018 | Smith | B62D 15/0255 |
| 2019/0263412 A1* | 8/2019 | Saikyo | B60W 30/18163 |

OTHER PUBLICATIONS

Shawpan, "Lane-Detector: Find lane from camera images of an autonomous car", https://github.com/shawpan/lane-detector, printed on Apr. 3, 2018, 12 pages.

* cited by examiner

SYSTEM AND METHOD FOR ADVANCED HIGHWAY LANE DETECTION

BACKGROUND

Many advanced driving assistance systems (ADAS) and other vehicle control systems rely on lane detection. Lane detection methods and systems are necessary for accurately detecting lane markings and recognizing lane types. Accurate lane detection is particularly important when driving on a highway, for example, when vehicles are merging on the highway and off the highway. Vehicles travelling along the highway should be aware of entrance and exit lanes and possible merging situations originating from these types of lanes.

BRIEF DESCRIPTION

According to one aspect, a computer-implemented method for lane detection includes receiving a road image from an image capture device and processing the road image to a binary road image. The method includes detecting a first solid line marking in the binary road image and detecting a second solid line marking outside of the first solid line marking in the binary road image. The first solid line marking and the second solid line marking are non-parallel lines. The method includes calculating a first distance between a first point of the first solid line marking and a first point of the second solid line marking. The first point of the first solid line marking and the first point of the second solid line marking are in a top portion of the binary road image. The method includes calculating a second distance between a second point of the first solid line marking and a second point of the second solid line marking. The second point of the first solid line marking and the second point of the second solid line marking are in a bottom portion of the binary road image. Further, the method includes determining a type of a merging lane based the first distance and the second distance.

According to another aspect, a system for lane detection includes an image capture device captures a road image of an area surrounding a vehicle and a processor operably connected for computer communication to the image capture device. The processor receives the road image from the image capture device and processes the road image into a binary road image. The processor detects a first solid line marking in the binary road image and a second solid line marking outside of the first solid line marking in the binary road image. The first solid line marking and the second solid line marking are non-parallel lines. Further, the processor calculates a first distance between a first point of the first solid line marking and a first point of the second solid line marking. The first point of the first solid line marking and the first point of the second solid line marking are in a top portion of the binary road image. The processor calculates a second distance between a second point of the first solid line marking and a second point of the second solid line marking. The second point of the first solid line marking and the second point of the second solid line marking are in a bottom portion of the binary road image. Additionally, the processor determines a type of a merging lane based the first distance and the second distance.

According to a further aspect, a non-transitory computer-readable storage medium including instructions that when executed by a processor, cause the processor to receive a road image from an image capture device, process the road image to a binary road image, detect a first solid line marking in the binary road image, and detect a second solid line marking outside of the first solid line marking in the binary road image. The first solid line marking and the second solid line marking are non-parallel lines. The processor calculates a first distance between a first point of the first solid line marking and a first point of the second solid line marking. The first point of the first solid line marking and the first point of the second solid line marking are in a top portion of the binary road image. The processor calculates a second distance between a second point of the first solid line marking and a second point of the second solid line marking. The second point of the first solid line marking and the second point of the second solid line marking are in a bottom portion of the binary road image. Further, the processor determines a type of a merging lane based the first distance and the second distance.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

Figure 1B:
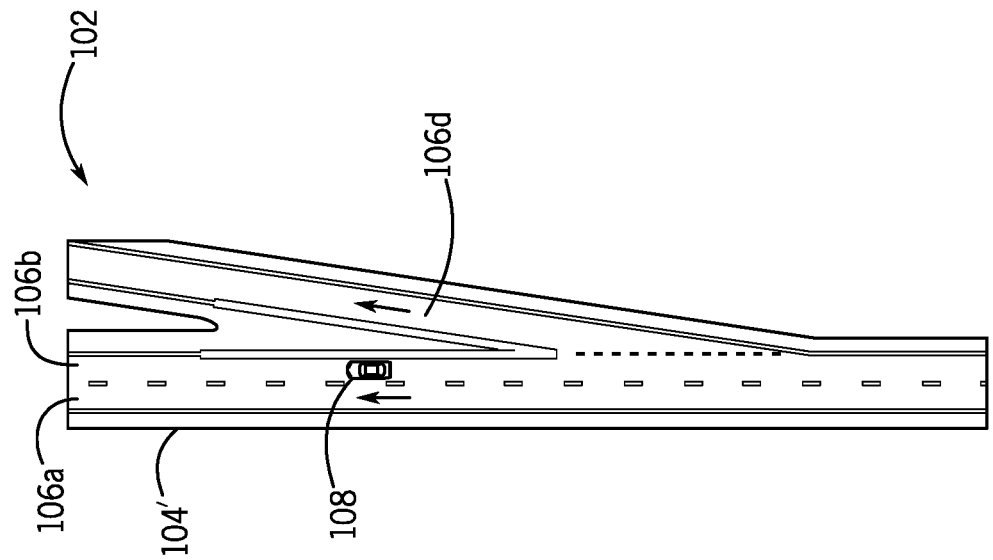
FIG. 1B is an illustrative example of a traffic scenario showing an exit lane according to an exemplary embodiment.

The following includes definitions of selected terms employed herein. The definitions include various examples and/or forms of components that fall within the scope of a term and that can be used for implementation. The examples are not intended to be limiting. Further, the components discussed herein, can be combined, omitted or organized with other components or into organized into different architectures.

"Bus," as used herein, refers to an interconnected architecture that is operably connected to other computer components inside a computer or between computers. The bus can transfer data between the computer components. The bus can be a memory bus, a memory processor, a peripheral bus, an external bus, a crossbar switch, and/or a local bus, among others. The bus can also be a vehicle bus that interconnects components inside a vehicle using protocols such as Media Oriented Systems Transport (MOST), Processor Area network (CAN), Local Interconnect network (LIN), among others.

"Component", as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) can reside within a process and/or thread. A computer component can be localized on one computer and/or can be distributed between multiple computers.

"Computer communication", as used herein, refers to a communication between two or more computing devices (e.g., computer, personal digital assistant, cellular telephone, network device, vehicle, vehicle computing device, infrastructure device, roadside device) and can be, for example, a network transfer, a data transfer, a file transfer, an applet transfer, an email, a hypertext transfer protocol (HTTP) transfer, and so on. A computer communication can occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), a vehicle-to-vehicle (V2V) network, a vehicle-to-everything (V2X) network, a vehicle-to-infrastructure (V2I) network, among others. Computer communication can utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wideband (UWAB), multiple-input and multiple-output (MIMO), telecommunications and/or cellular network communication (e.g., SMS, MMS, 3G, 4G, LTE, 5G, GSM, CDMA, WAVE), satellite, dedicated short range communication (DSRC), among others.

"Computer-readable medium," as used herein, refers to a non-transitory medium that stores instructions and/or data. A computer-readable medium can take forms, including, but not limited to, non-volatile media, and volatile media. Non-volatile media can include, for example, optical disks, magnetic disks, and so on. Volatile media can include, for example, semiconductor memories, dynamic memory, and so on. Common forms of a computer-readable medium can include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Database," as used herein, is used to refer to a table. In other examples, "database" can be used to refer to a set of tables. In still other examples, "database" can refer to a set of data stores and methods for accessing and/or manipulating those data stores. A database can be stored, for example, at a disk and/or a memory.

"Disk," as used herein can be, for example, a magnetic disk drive, a solid-state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

"Input/output device" (I/O device) as used herein can include devices for receiving input and/or devices for outputting data. The input and/or output can be for controlling different vehicle features which include various vehicle components, systems, and subsystems. Specifically, the term "input device" includes, but it not limited to: keyboard, microphones, pointing and selection devices, cameras, imaging devices, video cards, displays, push buttons, rotary knobs, and the like. The term "input device" additionally includes graphical input controls that take place within a user interface which can be displayed by various types of mechanisms such as software and hardware based controls, interfaces, touch screens, touch pads or plug and play devices. An "output device" includes, but is not limited to: display devices, and other devices for outputting information and functions.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry can include and/or be a part of a processor controlled by an algorithm, a discrete logic (e.g., ASIC), an analog circuit, a digital circuit, a programmed logic device, a memory device containing instructions, and so on. Logic can include one or more gates, combinations of gates, or other circuit components. Where multiple logics are described, it can be possible to incorporate the multiple logics into one physical logic. Similarly, where a single logic is described, it can be possible to distribute that single logic between multiple physical logics.

"Memory," as used herein can include volatile memory and/or nonvolatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory can store an operating system that controls or allocates resources of a computing device.

"Operable connection," or a connection by which entities are "operably connected," is one in which signals, physical communications, and/or logical communications can be sent and/or received. An operable connection can include a wireless interface, a physical interface, a data interface, and/or an electrical interface.

"Module", as used herein, includes, but is not limited to, non-transitory computer readable medium that stores instructions, instructions in execution on a machine, hardware, firmware, software in execution on a machine, and/or combinations of each to perform a function(s) or an action (s), and/or to cause a function or action from another module, method, and/or system. A module can also include logic, a software controlled microprocessor, a discrete logic circuit, an analog circuit, a digital circuit, a programmed logic device, a memory device containing executing instructions, logic gates, a combination of gates, and/or other circuit components. Multiple modules can be combined into one module and single modules can be distributed among multiple modules.

"Portable device", as used herein, is a computing device typically having a display screen with user input (e.g., touch, keyboard) and a processor for computing. Portable devices include, but are not limited to, handheld devices, mobile devices, smart phones, laptops, tablets and e-readers.

"Processor," as used herein, processes signals and performs general computing and arithmetic functions. Signals processed by the processor can include digital signals, data signals, computer instructions, processor instructions, messages, a bit, a bit stream, that can be received, transmitted and/or detected. Generally, the processor can be a variety of various processors including multiple single and multicore processors and co-processors and other multiple single and multicore processor and co-processor architectures. The processor can include logic circuitry to execute actions and/or algorithms.

"Vehicle," as used herein, refers to any moving vehicle that is capable of carrying one or more human occupants and is powered by any form of energy. The term "vehicle" includes, but is not limited to cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle powered by any form of energy. The autonomous vehicle can carry one or more human occupants. Further, the term "vehicle" can include vehicles that are automated or non-automated with pre-determined paths or free-moving vehicles.

"Vehicle display", as used herein can include, but is not limited to, LED display panels, LCD display panels, CRT display, plasma display panels, touch screen displays, among others, that are often found in vehicles to display information about the vehicle. The display can receive input (e.g., touch input, keyboard input, input from various other input devices, etc.) from a user. The display can be located in various locations of the vehicle, for example, on the dashboard or center console. In some embodiments, the display is part of a portable device (e.g., in possession or associated with a vehicle occupant), a navigation system, an infotainment system, among others.

"Vehicle control system" and/or "vehicle system," as used herein can include, but is not limited to, any automatic or manual systems that can be used to enhance the vehicle, driving, and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, an interior or exterior camera system among others.

Figure 1A:
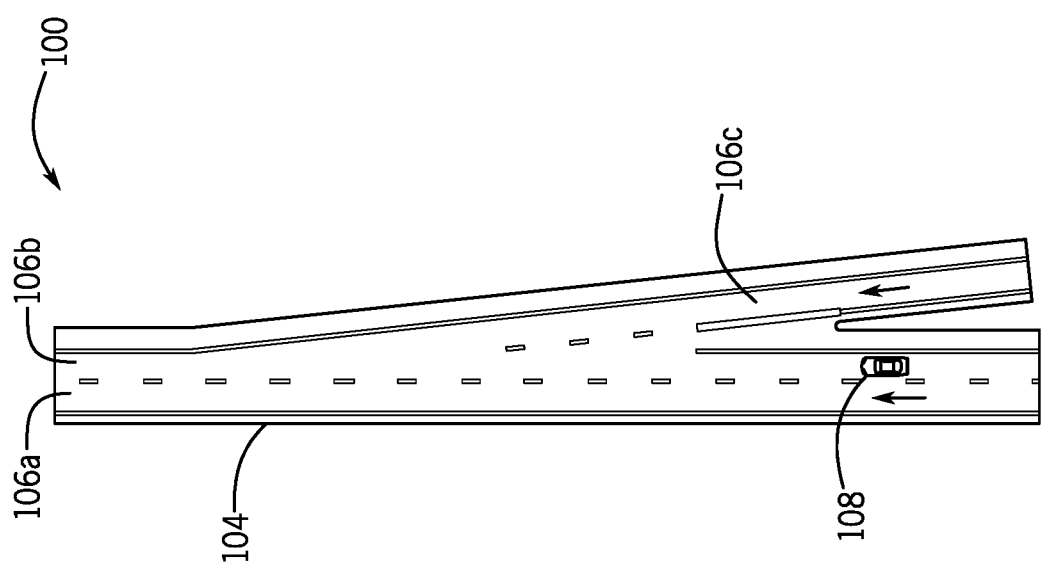
FIG. 1A is an illustrative example of a traffic scenario showing an entrance lane according to an exemplary embodiment.

Generally the methods and systems discussed herein utilize image based lane detection techniques for classifying a lane on a highway as a merging lane, for example, an entrance lane or an exit lane to a highway. Referring now to the drawings, wherein the showings are for purposes of illustrating one or more exemplary embodiments and not for purposes of limiting the same, FIG. 1A illustrates an exemplary highway traffic scenario 100 with an entrance lane configuration, and FIG. 1B illustrates an exemplary highway traffic scenario 102 with an exit lane configuration. As shown in FIG. 1A, a highway 104 includes a first lane 106a, a second lane 106b, and a third lane 106c. Arrows indicate the direction of travel flows from the bottom of FIG. 1A to the top of FIG. 1A. Each lane can be defined by one or more road lane markings or road lane lines (e.g., solid lines, dashed lines, broken lines, and lines of different colors). More specifically, in FIG. 1A, a solid line is to the left of the first lane 106a (i.e., the left most through lane), a solid line is to the right of the second lane 106b, a solid line is to the left of the third lane 106c, a solid line separates the third lane 106c from the right shoulder, and the through lanes (i.e., the first lane 106a, the second lane 106b) are separated from each other by a broken line (e.g., dashed line).

In FIG. 1A, the third lane 106c is an entrance lane, an entrance ramp, or an acceleration lane that allows vehicles to access (e.g., enter) the highway 104 by using the third lane 106c and merging into the second lane 106b. Thus, the third lane 106c is a potential merging lane with respect to the second lane 106b where vehicles entering the highway 104 using the third lane 106c may merge with other vehicles (e.g., the vehicle 108) in the second lane 106b. More specifically, the third lane 106c is an entrance ramp lane from the right side that joins through the highway 104. As the third lane 106c approaches the second lane 106b, the solid line to the left of the third lane 106c begins to taper towards the solid line to the right of the second lane 106b to form a triangle. The triangle then changes into a broken white line until the third lane 106c merges with the second lane 106b.

In contrast, in FIG. 1B, the highway 104' includes the first lane 106a, the second lane 106b, and a fourth lane 106d. Arrows indicate the direction of travel flows from the bottom of FIG. 1B to the top of FIG. 1B. As mentioned above, each lane can be defined by one or more road lane markings or road lane lines (e.g., solid lines, dashed lines, broken lines, and lines of different colors). The solid line is to the left of the first lane 106*a*, a solid line is to the right of the second lane 106*b*, a solid line is to the left of the fourth lane 106*d*, a solid line separates the fourth lane 106*d* from the right shoulder, and the through lanes (i.e., the first lane 106*a*, the second lane 106*b*) are separated from each other by a broken line (e.g., dashed line)

In the scenario shown in FIG. 1B, the fourth lane 106*d* is an exit lane, an exit ramp, or a deceleration lane. The fourth lane 106*d* is a potential merging lane with respect to the second lane 106*b* because vehicles (not shown) travelling along the second lane 106*b* merge into the fourth lane 106*d* to exit the highway 104'. More specifically, the fourth lane 106*d* is an exit ramp that separates from the highway 104' to the right side. As the fourth lane 106*d* begins to separate, a broken white line forms as an extension of the right most lane line of the second lane 106*b* and leads to a triangle formed to by the solid line to the right of the second lane 106*b* and the solid line to the left of the fourth lane 106*d*. Thus, as the fourth lane 106*d* separates from the second lane 106*b*, the solid line to the left of the fourth lane 106*d* tapers to the right to form a triangle shape.

As can be seen from FIGS. 1A and 1B, different types of lane markings can be used to distinguish and define lanes and the type of lane. For example, as will be discussed herein, solid lines in a tapered configuration (e.g., the triangle shapes discussed above) can be detected using image processing techniques and used to identify a lane and classify the type of lane (e.g., entrance, exit). Thus, the systems and methods disclosed herein allow the vehicle 108 to distinguish lanes that may create merging scenarios and control the vehicle 108, or other vehicles travelling along the highway, accordingly.

Figure 2:
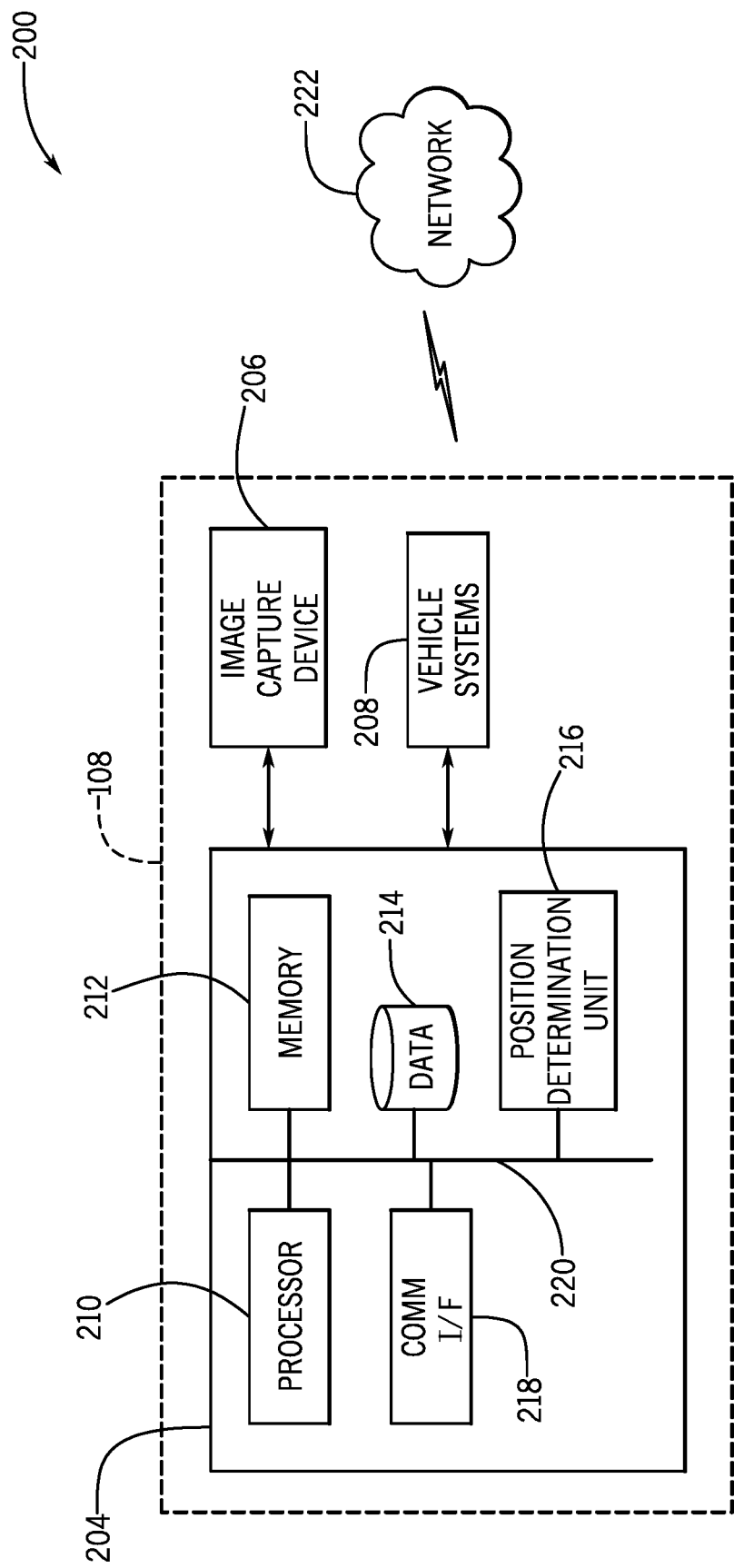
FIG. 2 is a block diagram illustrating an operating environment for lane detection according to an exemplary embodiment.

Referring now to FIG. 2, a schematic view of an operating environment 200 including the vehicle 108 for implementing methods and systems for lane detection according to an exemplary embodiment will be discussed. The components of the operating environment 200 and the vehicle 108, as well as the components of other systems, hardware architectures, and software architectures discussed herein, can be combined, omitted, or organized into different architectures for various embodiments. The vehicle 108 includes a vehicle computing device (VCD) 204, an image capture device 206, and vehicle systems 208. The VCD 204 can include provisions for processing, communicating and interacting with various components of the vehicle 108 and other components of the operating environment 200. In one embodiment, the VCD 204 can be implemented with the vehicle 108, for example, as part of a telematics unit, a head unit, a navigation unit, an infotainment unit, an electronic control unit, among others. In other embodiments, the VCD 204 can be implemented remotely from the vehicle 108, for example, with a portable device (not shown) or a device connected via a network (e.g., a network 222).

The VCD 204 can utilize the image capture device 206 to capture images surrounding an environment of the vehicle 108. For example, the image capture device 206 can capture road images directed towards a forward travelling path (e.g., forward looking) of the vehicle 108. The image capture device 206 can include one or more cameras (e.g., stereo cameras, three-dimensional cameras, image sensors) that may be mounted on the vehicle 108, for example, mounted on a windshield, a front dashboard, a grill, a rear-view mirror, among others. In another embodiment, the image capture device 206 can include a portable device (not shown) with image capture hardware and functionality (e.g., a camera). The road images provided by the image capture device 206 can be in any type, for example, two-dimensional, three-dimensional, stereo, among others. As will be discussed herein, the VCD 204 and/or the image capture device 206 can process the road images for lane detection.

The VCD 204 can also use the vehicle systems 208 to obtain vehicle information about the vehicle 108. As mentioned above, the vehicle systems 208 can include, but are not limited to, any automatic or manual systems that can be used to enhance the vehicle, driving, and/or safety. It is understood that the vehicle systems 208 can include various vehicle sensors (not shown) that sense and measure different stimuli (e.g., a signal, a property, a measurement, a quantity) associated with the vehicle 108 and/or a particular vehicle system. For example, other vehicle sensors can include cameras mounted to the interior or exterior of the vehicle 108 (e.g., as part of the image capture device 206), radar and laser sensors mounted to the exterior of the vehicle 108, external cameras, radar and laser sensors (e.g., on other vehicles in a vehicle-to-vehicle network, street cameras, surveillance cameras). The sensors can be any type of sensor, for example, acoustic, electric, environmental, optical, imaging, light, pressure, force, thermal, temperature, proximity, among others.

Vehicle information that can be provided in part by the vehicle systems 208 includes information related to the vehicle 108 and/or the vehicle systems 208. Specifically, vehicle information can include conditions, states, statuses, behaviors associated with vehicle 108 and/or the vehicle systems 208, and information about the external environment of the vehicle 108 (e.g., other vehicles, pedestrians, objects, road conditions, weather conditions). Exemplary vehicle information includes, but is not limited to, acceleration information, velocity information, steering information, lane departure information, blind spot monitoring information, braking information, collision warning information, navigation information, collision mitigation information and cruise control information. The above mentioned information can be used in conjunction with the lane detection discussed herein for vehicle control.

Referring again to the VCD 204 of FIG. 2, the VCD 204 can generally include a processor 210, a memory 212, a data store 214 (e.g., a disk), a position determination unit 216, and a communication interface 218, which are each operably connected for computer communication via a bus 220 and/or other wired and wireless technologies discussed herein. The processor 210 can include logic circuitry (not shown) with hardware, firmware, and software architecture frameworks for facilitating lane detection using the components shown in FIG. 2. Thus, in some embodiments, the processor 210 can store application frameworks, kernels, libraries, drivers, application program interfaces, among others, to execute and control hardware and functions discussed herein. In some embodiments, the memory 212 and/or the data store 214 can store similar components as the processor 210 for execution by the processor 210.

The position determination unit 216 can include hardware (e.g., sensors) and software to determine a position and/or orientation of the vehicle 108. In one embodiment, the position determination unit 216 includes an inertial measurement unit (IMU). The IMU can include a gyroscope, accelerometer, magnetometers, among others. In other embodiments, the position determination unit 216 can include a global positioning system (GPS) and/or a navigation system that provides a geolocation of the vehicle 108, navigation maps and navigation information. In some embodiments, information from the position determination unit 216 can be utilized for lane detection.

The communication interface 218 can include software and hardware to facilitate data input and output between the components of the VCD 204 and other components shown in FIG. 2. Specifically, the communication interface 218 can include network interface controllers (not shown) and other hardware and software that manages and/or monitors connections and controls bi-directional data transfer between the communication interface 218 and other components of the operating environment 200. The VCD 204 can communicate with other components of the operating environment 200, such as, other vehicles (not shown), and servers (not shown), among others, using the communication interface 218 and computer communication systems and protocols discussed herein. For example, the VCD 204 can be operatively connected for computer communication with the network 222, which can be a wireless communication network. The network 222 can facilitate communication with the vehicle 108 to other entities (e.g., other vehicles, services).

Figure 3:
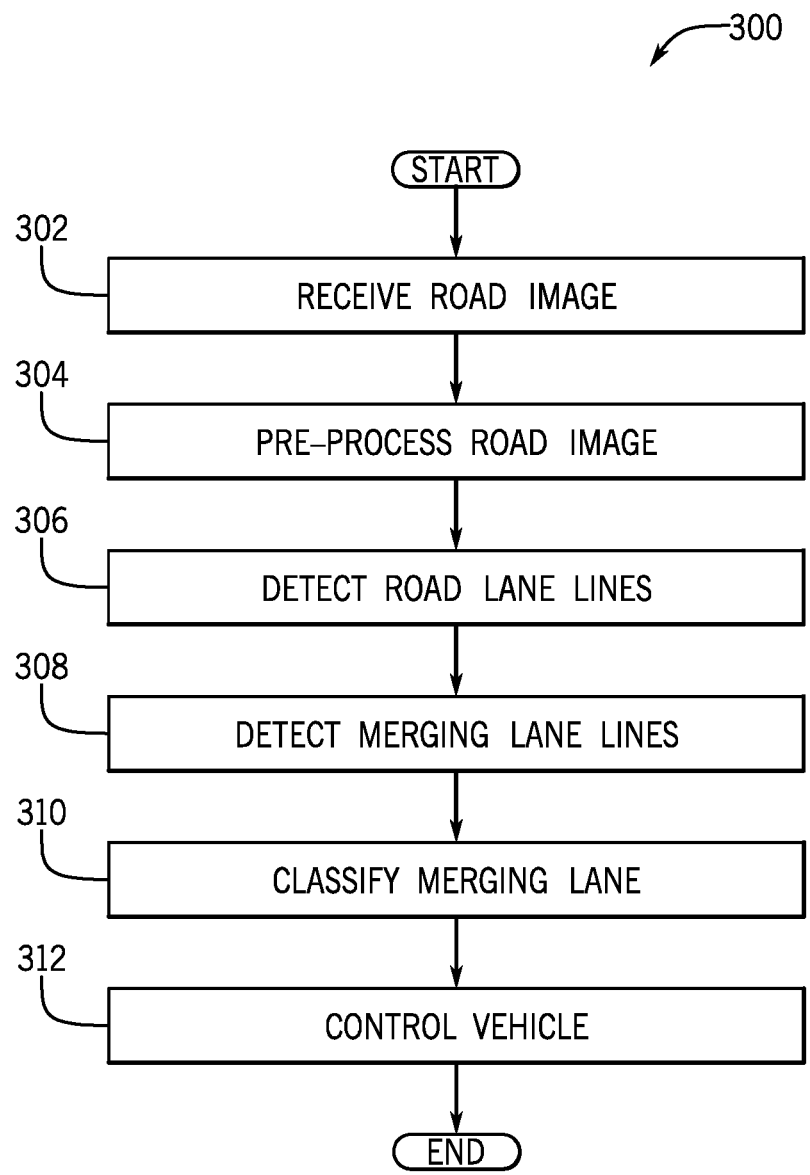
FIG. 3 is a process flow diagram of an exemplary method for lane detection according to an exemplary embodiment.
Figure 5B:
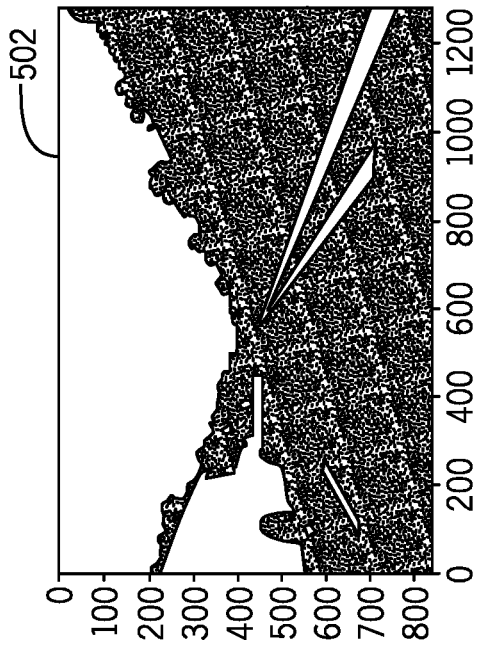
FIG. 5B is an illustrative example of a binary road image converted from the road image of FIG. 5A according to an exemplary embodiment.
Figure 5C:
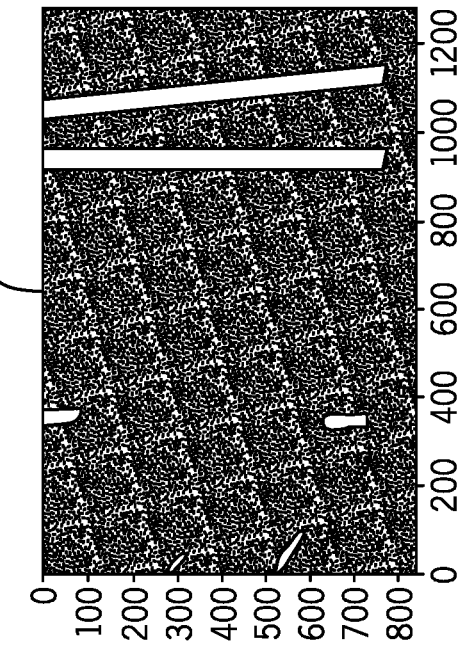
FIG. 5C is an illustrative example of the binary road image of FIG. 5B after a perspective transform according to an exemplary embodiment.
Figure 5A:
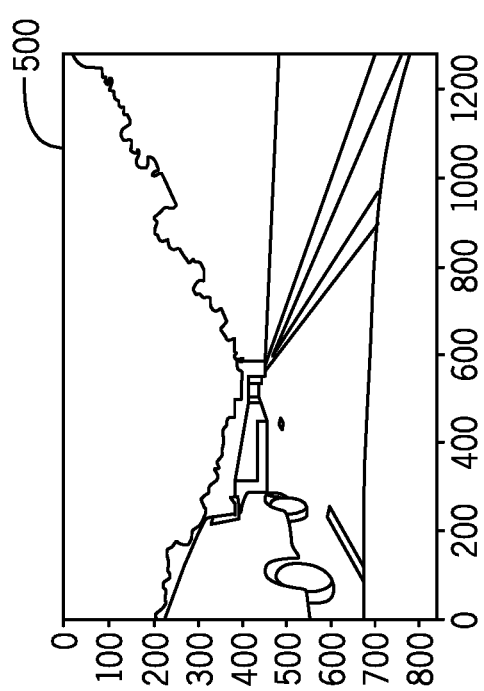
FIG. 5A is an illustrative example of a road image according to an exemplary embodiment.

The illustrative examples shown in FIGS. 1A, 1B and the components of FIG. 2 will now be described in more detail with reference to FIG. 3 and a method 300 for lane detection according to an exemplary embodiment. At block 302, the method 300 includes receiving a road image. For example, the VCD 204 can receive a road image from the image capture device 206. FIG. 5A shows an exemplary road image 500, for example, an area surrounding the vehicle 108 in the entrance lane traffic scenario 100 of FIG. 1A. The road image 500 includes road lane line markings on the road on which the vehicle 108 is travelling.

Figure 4:
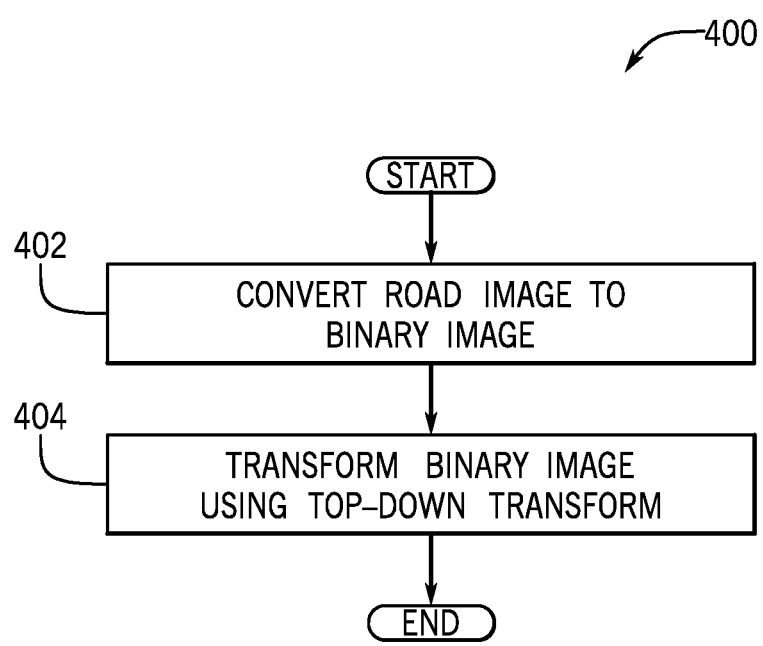
FIG. 4 is a process flow diagram of an exemplary method for road image pre-processing according to an exemplary embodiment.

Referring again to FIG. 3, at block 304, the method 300 includes pre-processing the road image. Block 304 will now be described in more detail with reference to method 400 of FIG. 4 for road image pre-processing according to an exemplary embodiment. At block 402, the method 400 includes converting the road image into a binary image. The VCD 204 can convert the road image 500 (e.g., a pixel image) into a binary road image 502 shown in FIG. 5B using binarization processing techniques. In some embodiments, the captured road image 500 is converted to CIELUV color space and then converted into the binary road image 502. It is also understood that other types of image processing and filtering not discussed herein can be performed.

Referring again to FIG. 4, at block 404 the method 400 includes transforming the binary road image according to a perspective (e.g., top-down) transform. Thus, the VCD 204 can warp the binary road image 502 to be a map view (e.g., bird's eye view) as shown by the binary road image 504 of FIG. 5C. The straightness of the road lane line markings are preserved by applying the perspective transform.

Referring again to FIG. 3, at block 306, the method 300 includes detecting road lane lines including the road lane lines defining a travelling lane (e.g., the second lane 106*b*) of the vehicle 108 and road lane lines outside of and to the right of the travelling lane of the vehicle 108 using image processing techniques. Block 306 will now be described in more detail with reference to method 600 of FIG. 6. In particular, the method 600 is for detecting a first solid line marking according to an exemplary embodiment. The first solid line marking is the solid lane line defining the right side of the travelling lane. For example, with respect to FIG. 1A, the solid road lane line defining the right side of the second lane 106*b*. Accordingly, at block 602, the method 600 includes defining a region of interest in the binary road image. For example, the region of interest can be based on the position and/or orientation of the vehicle 108 obtained from the position determination unit 216. In other embodiments, the region of interest is based on the binary road image itself, for example, a center portion of the binary road image. The region of interest includes the road lane lines that define the travelling lane (e.g., the second lane 106*b*) of the vehicle 108. In some embodiments discussed herein, the region of interest described with block 603 is referred to as a first search area.

Figure 7A:
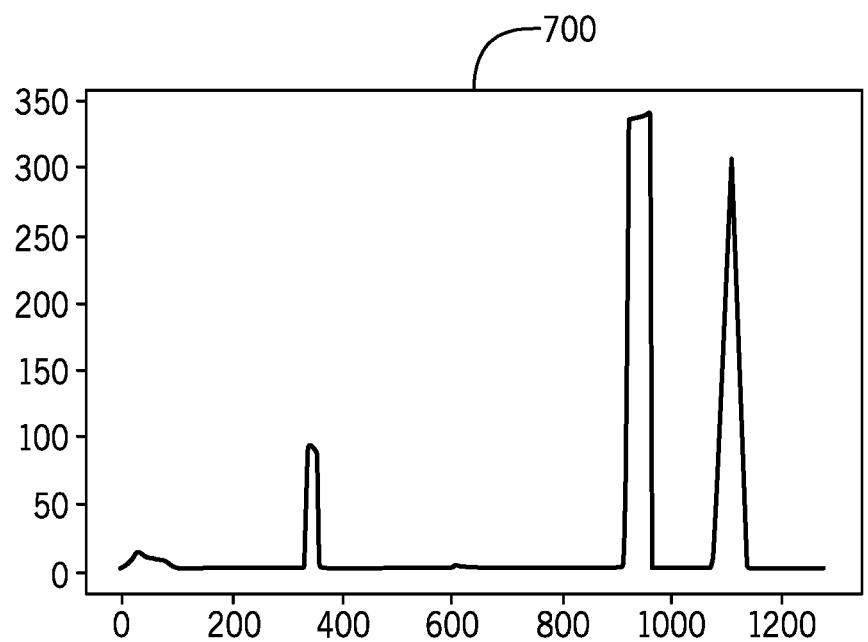
FIG. 7A is an illustrative example of a first histogram of the binary road image of FIG. 5C according to an exemplary embodiment.
Figure 7B:
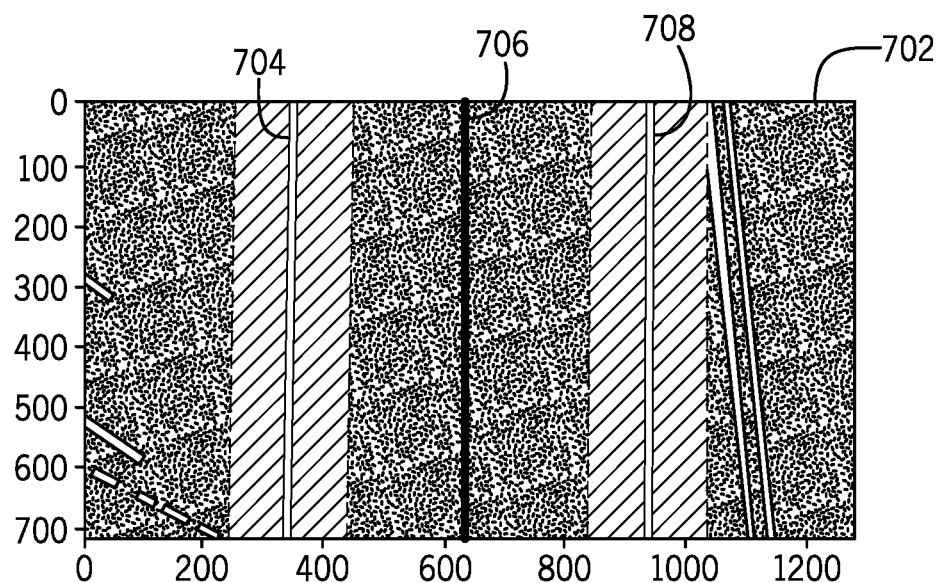
FIG. 7B is an illustrative example of the binary road image of FIG. 5C with parabolic model fitting according to the first histogram of FIG. 7A according to an exemplary embodiment.

At block 604, the method 600 includes performing image segmentation. For example, the VCD 204 can segment the binary road image within the region of interest (e.g., the first search area) into a plurality of vertical sections along the horizontal direction as indicated by the diagonal shading shown in the binary road image 702 of FIG. 7B. In one embodiment, the position of the road lane lines will be determined using intensity values of the road lane lines. Accordingly, at block 606, the method 600 includes calculating a histogram and fitting a parabolic model to determine the road lane lines. For example, the VCD 204 can calculate a histogram 700 (e.g., a first histogram) of the plurality of vertical sections as shown in FIG. 7A.

Thus, at block 608, the method 600 includes detecting solid road lane lines defining a right side of a road lane boundary based on the histogram. More specifically, the VCD 204 detects a first solid line marking in the binary road image based on the first histogram with parabolic fitting. In this way, the VCD 204 can discriminate between solid and broken road lane lines in the binary road image and determine the solid road lane line defining the right side of the travelling lane (e.g., the second lane 102*b*) of the vehicle 108. Referring again to FIGS. 7A and 7B, with the histogram 700 and the binary road image 702, the most centered two curves of the histogram 700 are fitted using a parabolic model to the binary road image 702 to be the detected lane lines. The solid lines and the dashed lines are discriminated based on their histogram values. Accordingly, in the binary road image 702, a solid line 704, a dashed line 706, and a solid line 708 are identified. The solid line 708 is the first solid line marking that defines the right side of the travelling lane of the vehicle 108.

Figure 8:
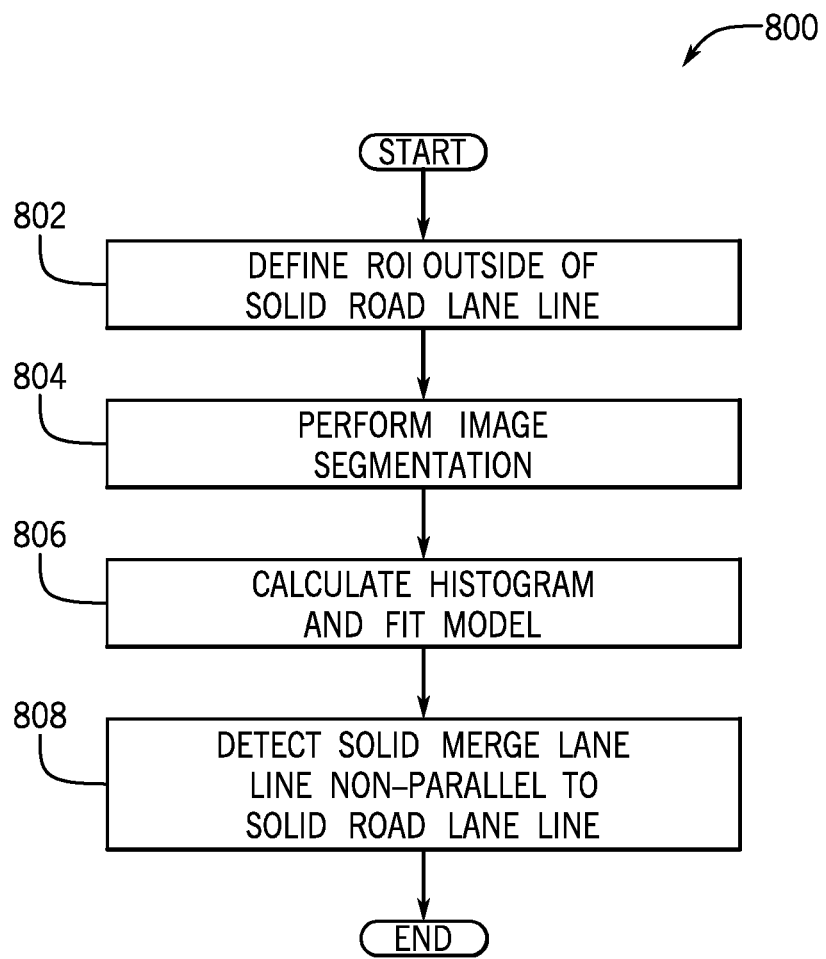
FIG. 8 is a process flow diagram of an exemplary method of detecting a second solid line marking according to an exemplary embodiment.

Referring again to FIG. 3, at block 308, the method 300 includes detecting merging lane lines. More specifically, the VCD 204 detects a second solid line marking outside of the first solid line marking in the binary road image. The first solid line marking and the second solid line marking are non-parallel lines. Block 308 will now be described in more detail with reference to method 800 of FIG. 8 for detecting the second solid line marking according to an exemplary embodiment. At block 802, the method 800 includes defining a second region of interest. Thus, upon detecting the first solid line marking in the binary road image (e.g., at block 608 of FIG. 6), the VCD 204 defines a second search area (e.g., a second region of interest) in a rightward direction of the first solid line marking.

Figure 6:
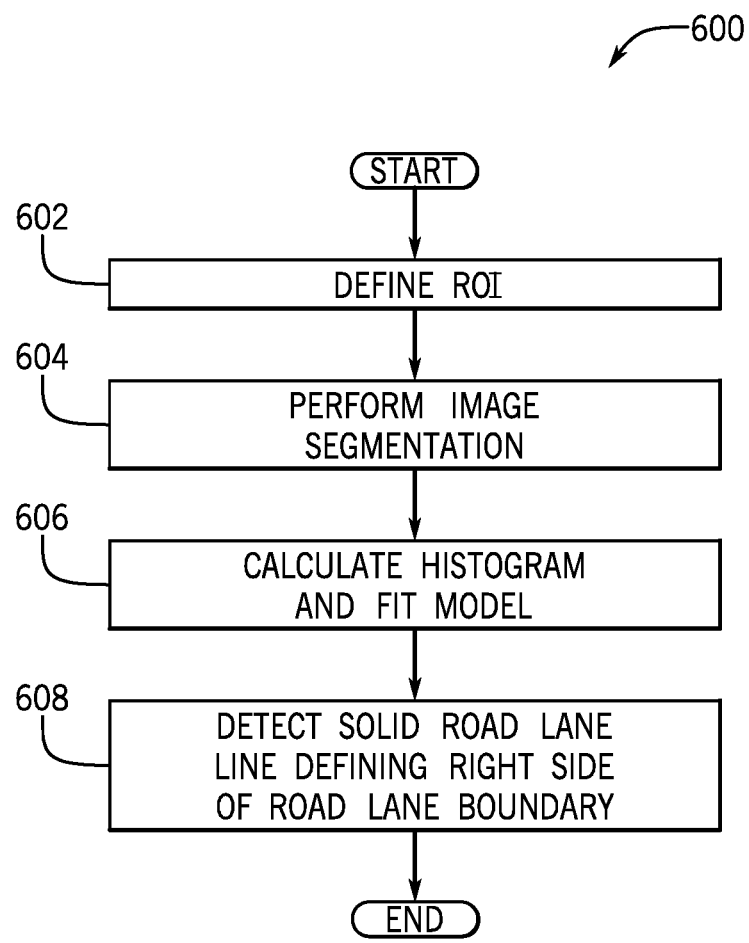
FIG. 6 is a process flow diagram of an exemplary method of detecting a first solid line marking according to an exemplary embodiment.
Figure 9A:
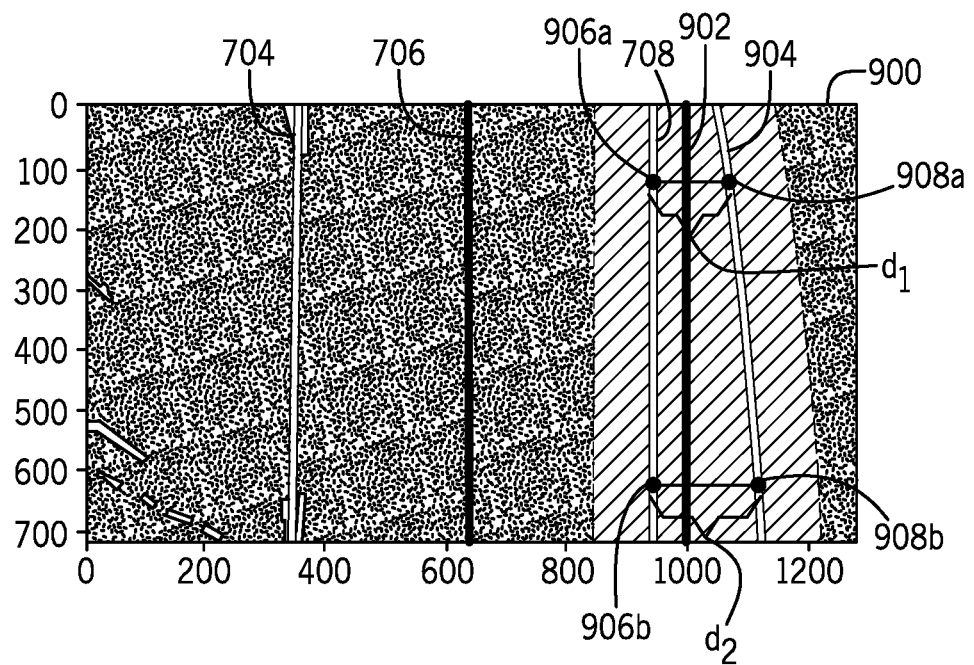
FIG. 9A is an illustrative example of the binary road image of FIG. 7B with parabolic model fitting parabolic fitting according to a second histogram according to an exemplary embodiment.

Similar to block 604 of FIG. 6, at block 804, the method 800 includes performing image segmentation. The VCD 204 segments the binary road image within the second search area into a plurality of vertical sections. FIG. 9A shows the binary road image 900 including a vertical section indicated by diagonal shading. Further, similar to block 606 of FIG. 6, at block 806, the method 800 includes calculating a histogram and fitting a parabolic model to determine the merge lane lines. Thus, the VCD 204 calculates a second histogram (not shown) of the plurality of vertical sections within the second search area. At block 808, the method 800 includes detecting the second solid line marking outside of the first solid line marking in the binary road image based on the second histogram with parabolic fitting. Accordingly, as can be seen in FIG. 9A, a dashed line 902 and a solid line 904 are identified based on the second histogram (not shown). The solid line 904 is the second solid line marking outside of the first solid line marking.

Figure 10:
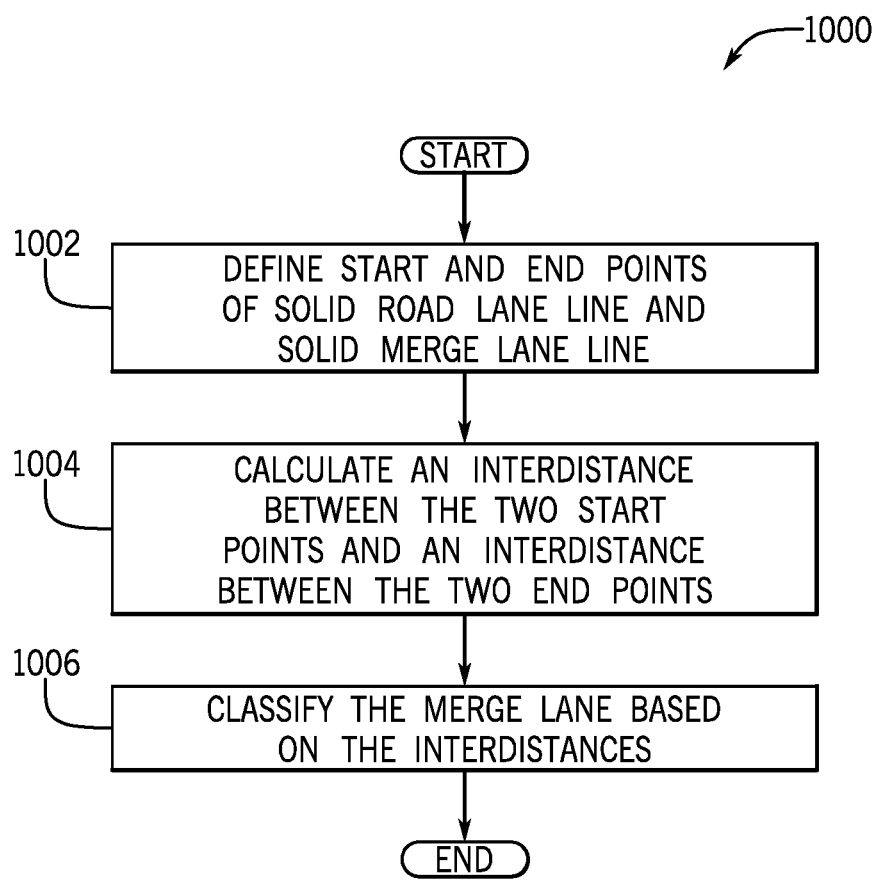
FIG. 10 is a process flow diagram of an exemplary method of detecting and/or classifying the merge lane according to an exemplary embodiment.

Referring again to FIG. 3, at block 310, the method 300 includes determining a type of merging lane. In one embodiment, determining the type of the merging lane includes classifying the merging lane as an entrance lane or an exit lane. This determination and/or classification can be based on comparing the first solid lane marking to the second solid lane marking, which will now be described in detail with reference to the method 1000 of FIG. 10 for detecting and/or classifying the merge lane according to an exemplary embodiment.

At block 1002, the method 1000 includes defining start and end points of the first solid line marking and the second solid line marking. More specifically, the VCD 204 defines a first point of the first solid line marking and a first point of the second solid line marking. As shown in FIG. 9A, a first point 906a of the first solid line marking 708 and a first point 908a of the second solid line marking 904 are in a top portion of the binary road image 900. Further, the VCD 204 defines a second point of the first solid line marking and a second point of the second solid line marking. As shown in FIG. 9A, a second point 906b of the first solid line marking 708 and the second point 908b of the second solid line marking 904 are in a bottom portion of the binary road image 900.

At block 1004, the method 1000 includes calculating inter-distances between the points determined at block 1002. More specifically, the VCD 204 calculates a first distance between the first point 906a of the first solid line marking 708 and the first point 908a of the second solid line marking 904. The VCD 204 also calculates a second distance between the second point 906b of the first solid line marking 708 and the second point 908b of the second solid line marking 904. In FIG. 9A, the first distance is indicated as first distance $d_1$ and the second distance is indicated as second distance $d_2$.

Figure 9B:
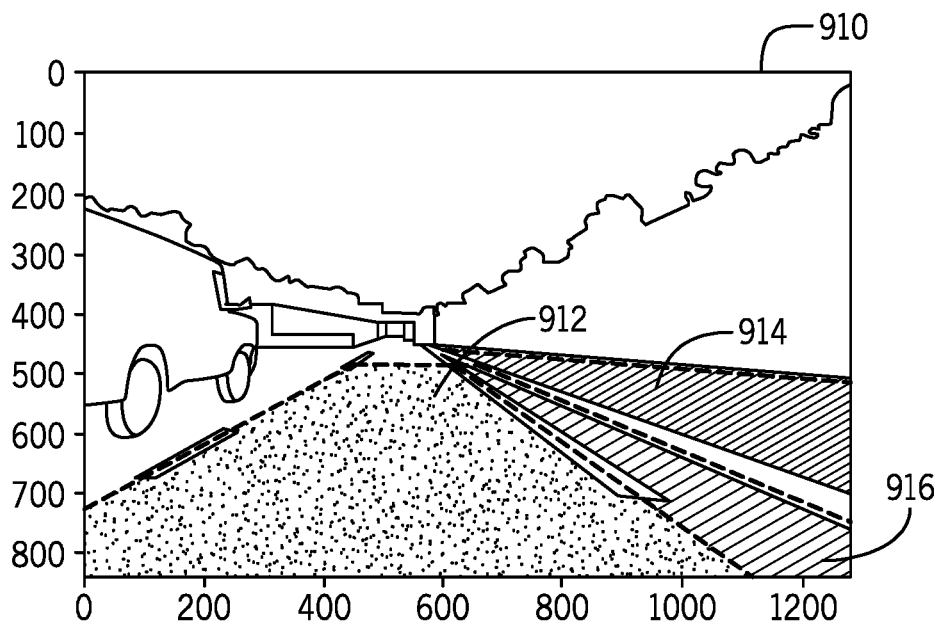
FIG. 9B is an illustrative example of a road lane and a merge lane as applied to the road image of FIG. 5A.

At block 1006, the method 1000 includes classifying the merge lane based on the inter-distances. This can be executed by the VCD 204 based on a difference between the first distance and the second distance. For example, upon determining the first distance is less than the second distance, the merging lane is classified as the entrance lane. Upon determining the first distance is greater than the second distance, the merging lane is classified as the exit lane. With respect to FIG. 9A, distance $d_1$ is less than distance $d_2$. Accordingly, the merging lane is classified as an entrance lane. The binary road image 900 is reversely warped to a road image 910 in FIG. 9B, which shows the travelling lane 912, the merging lane 914, and an area between the first solid lane line marking 708 and the second solid lane line marking 904. As can be seen in FIG. 9B, the merging lane 914 is an entrance lane.

As another illustrative example, with reference to FIG. 1A, the classification of third lane 106c is based on the tapered and/or triangle formulation of the solid line defining the right boundary of the second lane 106b and the solid line defining the left boundary of the third lane 106c. Here, because of the tapered shape of the lines, the first distance is less than the second distance, therefore the third lane 106c is classified as an entrance lane. With reference to FIG. 1B, the classification of the fourth lane 106d is based on the tapered and/or triangle formulation of the solid line defining the right boundary of the second lane 106b and the solid line defining the left boundary of the fourth lane 106d. Here, because of the tapered shape of the lines, the first distance is greater than the second distance, therefore the fourth lane 106d is classified as an exit lane.

Referring again to FIG. 3, at block 310 the method 300 includes controlling the vehicle, for example, based on the type of merging lane. The vehicle 108 can utilize the type of merging lane and the road lane line markings detected to control various vehicle systems 208. For example, a collision warning system can utilize the information along with sensor information about vehicles detected in the merging lane to control the vehicle 108 to avoid a collision and/or allow a merge maneuver by vehicles in the merging lane. It is understood that other types of vehicle control can also be implemented.

The embodiments discussed herein can also be described and implemented in the context of computer-readable storage medium storing computer executable instructions. Computer-readable storage media includes computer storage media and communication media. For example, flash memory drives, digital versatile discs (DVDs), compact discs (CDs), floppy disks, and tape cassettes. Computer-readable storage media can include volatile and nonvolatile, removable and non-removable media implemented in any method or technology for storage of information such as computer readable instructions, data structures, modules or other data. Computer-readable storage media excludes non-transitory tangible media and propagated data signals.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for lane detection, comprising:
    receiving a road image from an image capture device;
    processing the road image to a binary road image;
    detecting a first solid line marking in the binary road image;
    detecting a second solid line marking outside of the first solid line marking in the binary road image, wherein the first solid line marking and the second solid line marking are non-parallel lines;
    calculating a first distance between a first point of the first solid line marking and a first point of the second solid line marking, wherein the first point of the first solid line marking and the first point of the second solid line marking are in a top portion of the binary road image;
    calculating a second distance between a second point of the first solid line marking and a second point of the second solid line marking, wherein the second point of the first solid line marking and the second point of the second solid line marking are in a bottom portion of the binary road image; and
    determining a type of a merging lane based the first distance and the second distance.

2. The computer-implemented method of claim 1, wherein processing the road image to the binary road image includes transforming the binary road image according to a perspective transform.

3. The computer-implemented method of claim 1, including defining a first search area including the first solid line marking and segmenting the binary road image within the first search area into a plurality of vertical sections.

4. The computer-implemented method of claim 3, including calculating a first histogram of the plurality of vertical sections and wherein detecting the first solid line marking in the binary road image is based on the first histogram with parabolic fitting.

5. The computer-implemented method of claim 4, wherein upon detecting the first solid line marking in the binary road image, defining a second search area in a rightward direction of the first solid line marking.

6. The computer-implemented method of claim 5, including segmenting the binary road image within the second search area into a plurality of vertical sections.

7. The computer-implemented method of claim 6, including calculating a second histogram of the plurality of vertical sections and wherein detecting the second solid line marking outside of the first solid line marking in the binary road image is based on the second histogram with parabolic fitting.

8. The computer-implemented method of claim 1, wherein determining the type of the merging lane includes classifying the merging lane as an entrance lane or an exit lane based on a difference between the first distance and the second distance.

9. The computer-implemented method of claim 8, wherein upon determining the first distance is less than the second distance, the merging lane is classified as the entrance lane.

10. The computer-implemented method of claim 8, wherein upon determining the first distance is greater than the second distance, the merging lane is classified as the exit lane.

11. A system for lane detection, comprising:
an image capture device captures a road image of an area surrounding a vehicle; and
a processor operably connected for computer communication to the image capture device, wherein the processor receives the road image from the image capture device and processes the road image into a binary road image, wherein the processor detects a first solid line marking in the binary road image and a second solid line marking outside of the first solid line marking in the binary road image, wherein the first solid line marking and the second solid line marking are non-parallel lines,
wherein the processor calculates a first distance between a first point of the first solid line marking and a first point of the second solid line marking, wherein the first point of the first solid line marking and the first point of the second solid line marking are in a top portion of the binary road image, the processor calculates a second distance between a second point of the first solid line marking and a second point of the second solid line marking, wherein the second point of the first solid line marking and the second point of the second solid line marking are in a bottom portion of the binary road image, and the processor determines a type of a merging lane based the first distance and the second distance.

12. The system of claim 11, wherein the processor defines a second search area in the binary road image positioned in a rightward direction outside of the first solid line marking.

13. The system of claim 11, wherein the processor detects the first solid line marking and the second solid line marking based on an intensity value analysis and parabolic fitting.

14. The system of claim 11, wherein the processor determines the merging lane is an entrance lane when the first distance is less than the second distance.

15. The system of claim 11, wherein the processor determines the merging lane is an exit lane when the first distance is greater than the second distance.

16. A non-transitory computer-readable storage medium including instructions that when executed by a processor, cause the processor to:
receive a road image from an image capture device;
process the road image to a binary road image;
detect a first solid line marking in the binary road image;
detect a second solid line marking outside of the first solid line marking in the binary road image, wherein the first solid line marking and the second solid line marking are non-parallel lines;
calculate a first distance between a first point of the first solid line marking and a first point of the second solid line marking, wherein the first point of the first solid line marking and the first point of the second solid line marking are in a top portion of the binary road image;
calculate a second distance between a second point of the first solid line marking and a second point of the second solid line marking, wherein the second point of the first solid line marking and the second point of the second solid line marking are in a bottom portion of the binary road image; and
determine a type of a merging lane based the first distance and the second distance.

17. The non-transitory computer-readable storage medium of claim 16, including causing the processor to detect the first solid line marking and the second solid line marking based on an intensity value analysis and parabolic fitting.

18. The non-transitory computer-readable storage medium of claim 16, including causing the processor to classify the merging lane as an exit lane or an entrance lane.

19. The non-transitory computer-readable storage medium of claim 18, wherein upon determining the first distance is less than the second distance, the merging lane is classified as the entrance lane.

20. The non-transitory computer-readable storage medium of claim 18, wherein upon determining the first distance is greater than the second distance, the merging lane is classified as the exit lane.

* * * * *